(12) United States Patent
Brkovic et al.

(10) Patent No.: US 11,192,479 B1
(45) Date of Patent: Dec. 7, 2021

(54) SEAT ASSEMBLY HAVING A TELESCOPING TUBE JOINT AND METHOD OF MANUFACTURE

(71) Applicant: Lear Corporation, Southfield, MI (US)

(72) Inventors: Bozdar Brkovic, Bell River (CA); Roger Stephens, Southfield, MI (US); Daniel J. Peppernick, Redford Charter Township, MI (US); Dharmesh Kansara, Bloomfield Hills, MI (US); Luke Boeve, Northville, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/018,170

(22) Filed: Sep. 11, 2020

(51) Int. Cl.
*B60N 2/68* (2006.01)
*B60N 2/015* (2006.01)
*B60N 2/01* (2006.01)

(52) U.S. Cl.
CPC ............... *B60N 2/682* (2013.01); *B60N 2/01* (2013.01); *B60N 2/015* (2013.01)

(58) Field of Classification Search
CPC ....... B60N 2/68; B60N 2/682; B64D 11/0648
See application file for complete search history.

(56) References Cited

U.S. PATENT DOCUMENTS

| 3,759,572 A * | 9/1973 | Koepke | A47C 4/022 |
| | | | 297/452.4 |
| 4,240,663 A | 12/1980 | Locher | |
| 5,035,467 A | 7/1991 | Axelson et al. | |
| 5,498,096 A | 3/1996 | Johnson | |
| 5,547,259 A | 8/1996 | Fredrick | |
| 6,352,307 B1 * | 3/2002 | Engman | A61G 5/1059 |
| | | | 297/284.1 |
| 8,899,615 B2 * | 12/2014 | Dijkstra | B62B 9/087 |
| | | | 280/658 |
| 8,931,850 B2 * | 1/2015 | Mitsuhashi | B60N 2/22 |
| | | | 297/452.2 |
| 2003/0141752 A1 * | 7/2003 | Igarashi | B60N 2/242 |
| | | | 297/452.18 |
| 2019/0106028 A1 * | 4/2019 | Kitagawa | B60N 2/4221 |
| 2020/0171990 A1 * | 6/2020 | Hong | B60N 2/64 |

FOREIGN PATENT DOCUMENTS

| CN | 107074132 A | * | 8/2017 | ............ A47C 1/024 |
| CN | 208216554 U | * | 12/2018 | ............ B60N 2/36 |
| CN | 109455125 A | * | 3/2019 | |
| CN | 109562706 A | * | 4/2019 | ........... B60N 2/3065 |
| CN | 112046367 A | * | 12/2020 | |
| DE | 19727006 A1 | * | 1/1998 | ............ B60N 2/646 |
| DE | 102008038851 A1 | | 2/2010 | |
| DE | 102012218652 A1 | | 4/2014 | |
| EP | 3643563 A1 | * | 4/2020 | ............ B60N 2/68 |
| FR | 3058944 A1 | * | 5/2018 | ............ B60N 2/36 |
| WO | WO-2009149177 A1 | * | 12/2009 | ............ B60N 2/686 |
| WO | WO-2011163248 A1 | * | 12/2011 | ............ B60N 2/682 |
| WO | WO-2016042631 A | * | 3/2016 | ............ B60N 2/42 |
| WO | WO-2016076352 A1 | * | 5/2016 | ........... B60N 2/0232 |

\* cited by examiner

*Primary Examiner* — Timothy J Brindley
(74) *Attorney, Agent, or Firm* — Brooks Kushman PC

(57) ABSTRACT

A seat assembly and a method of manufacture. The seat assembly may include a seat bottom frame that has a perimeter tube assembly that may define an opening and a cross tube assembly that may extend across the opening. The perimeter tube assembly, the cross tube assembly, or both may have a telescoping tube joint.

20 Claims, 5 Drawing Sheets

SEAT ASSEMBLY HAVING A TELESCOPING TUBE JOINT AND METHOD OF MANUFACTURE

TECHNICAL FIELD

This document relates to a seat assembly having a telescoping tube joint and a method for making a seat assembly.

BACKGROUND

A modular automotive seat frame is disclosed in U.S. Pat. No. 5,547,259.

SUMMARY

In at least one embodiment, a seat assembly is provided. The seat assembly may have a seat bottom frame that may include a perimeter tube assembly and a cross tube assembly. The perimeter tube assembly may define a perimeter of the seat bottom frame and may extend around and define an opening. The cross tube assembly may extend across the opening. The cross tube assembly may include a first cross tube segment and a second cross tube segment. The first and second cross tube segments may cooperate to provide a cross tube telescoping tube joint in which an end of the first cross tube segment may be received inside the second cross tube segment. The second cross tube segment may define a window that may extend through the second cross tube segment. The first cross tube segment may be fixedly attached to the second cross tube segment with a weld that may be positioned in the window.

In at least one embodiment, a method of making a seat assembly is provided. The method may include positioning first, second, and third tubes such that a first end of the second tube may be disposed proximate a first end of the first tube, a first end of the third tube may be disposed proximate a second end of the first tube, and second ends of the second and third tubes may be arranged to provide a telescoping tube joint. First and second cross tube segments may be arranged to provide a cross tube telescoping tube joint. The first and second tubes may be joined to a first bracket. The first and third tubes may be joined to a second bracket. Ends of the first and second cross tube segments that are disposed opposite the cross tube telescoping joint may be welded to the second and third tubes, respectively. The telescoping tube joint may be welded to fixedly attach the second and third tubes. The cross tube telescoping tube joint may be welded to fixedly attach the first and second cross tube segments.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
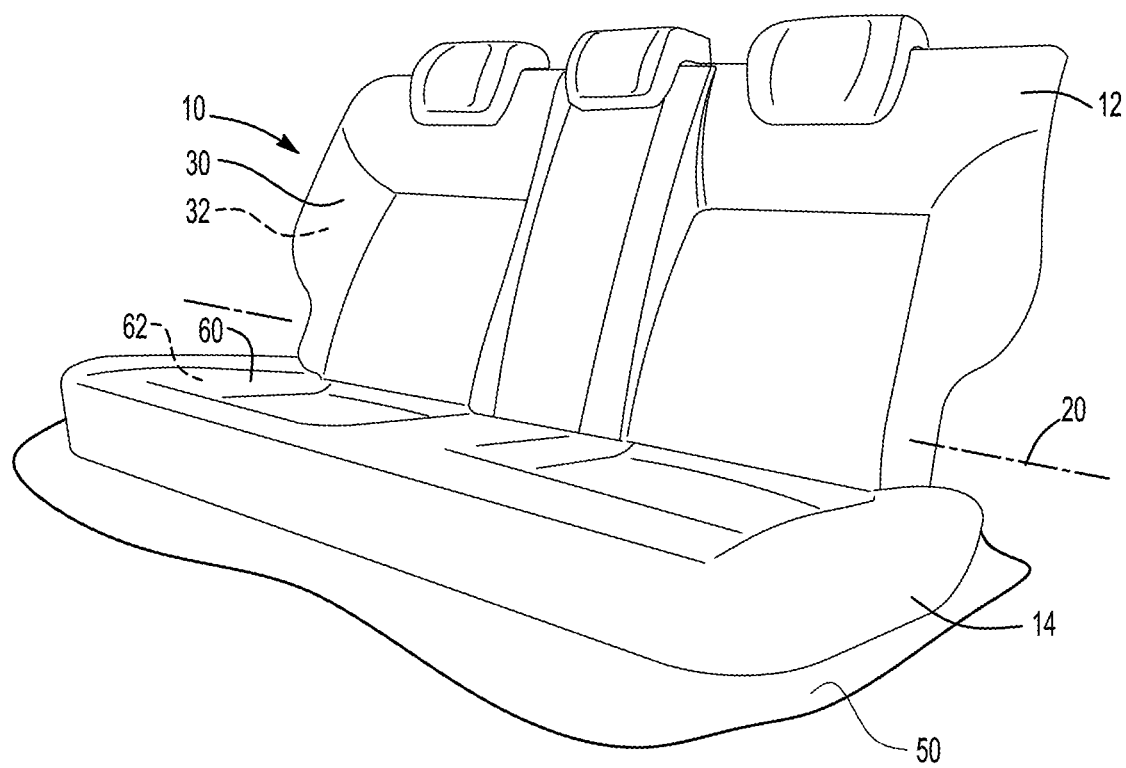
FIG. 1 is a perspective view of an example of a seat assembly.

Referring to FIG. 1, an example of a seat assembly 10 is shown. The seat assembly 10 may be provided with a vehicle, such as a motor vehicle like a car or truck. The seat assembly 10 may be configured as a rear seat that may be positioned behind a front seating row or front seat that may be occupied by a vehicle driver. The seat assembly 10 may include a seat back 12 and a seat bottom 14.

The seat back 12 may be disposed proximate the seat bottom 14 and may be configured to support the back of a seat occupant. The seat back 12 or a portion thereof may be rotatable about an axis 20 with respect to the seat bottom 14. The axis 20 may extend in a generally horizontal direction. In at least one configuration, the seat back 12 may include a trim cover 30, a cushion 32, and a seat back frame 34, which is best shown in FIG. 2.

Referring to FIG. 1, the trim cover 30 may form an exterior surface of at least a portion of the seat back 12. The trim cover 30 may be disposed on the cushion 32 and may at least partially cover or conceal the cushion 32. For example, the trim cover 30 may extend across a front side of the cushion 32 that may be configured to face toward and support a seat occupant. In addition, the trim cover 30 may extend across a top side and opposing lateral sides of the cushion 32. The trim cover 30 may be made of any suitable material, such as fabric, vinyl, leather, or combinations thereof. The trim cover 30 may be mounted on the seat back 12 in any suitable manner. For example, the trim cover 30 may be secured with one or more attachment features, such as a hook, clip, ring, hook and loop fastener, drawstring or the like.

The cushion 32 may be configured to help support a seat occupant. The cushion 32 may be disposed on the seat back frame 34 and may be made of any suitable material. For example, the cushion 32 may be made of a molded polymeric material, such as open cell foam or closed cell foam.

Figure 2:
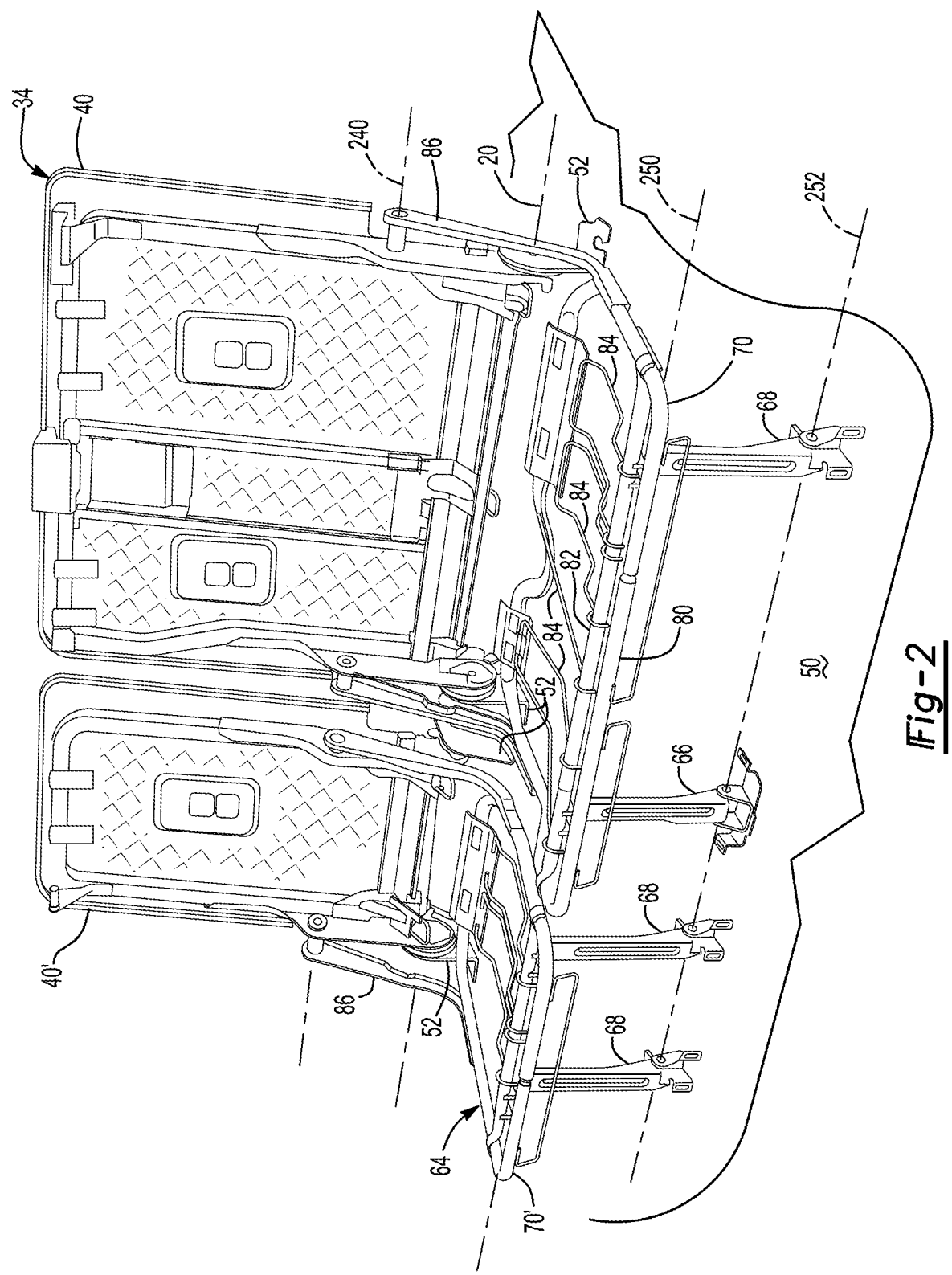
FIG. 2 is a perspective view showing a seat back frame and a seat bottom frame of the seat assembly.

Referring to FIG. 2, the trim cover 30 and cushions 32 are omitted to more clearly illustrate the frame of the seat assembly 10. The seat back frame 34 may have one or more seat back portions that may be rotatable about the axis 20 from a generally upright seating position shown in FIG. 1 to a folded position in which at least a portion of the seat back 12 and the seat back frame 34 may be folded over the top of the seat bottom 14. The seating position may be a nominal seating position or normal use position that may allow a person to occupy the seat assembly 10. As such, the seat back 12 may be reclined or angled slightly backward from vertical when in the seating position. A portion of the seat back 12 may contact the seat bottom 14 and/or may extend in a generally horizontal direction when in the folded position.

In the configuration shown in FIG. 2, the seat back frame 34, and hence the seat back 12, is depicted as being split into two portions that may be independently rotatable or pivotable about the axis 20 with respect to each other. For clarity in reference, the portions are numbered from right to left with reference numbers 40 and 40'. The portions 40, 40' may extend laterally across the vehicle or across the width of the seat back 12. The portions 40, 40' may or may not have substantially the same sizes. For example, the seat back 12 and seat back frame 34 in FIGS. 1 and 2 are provided with a 60/40 split configuration in which the portions 40 and 40' have different widths that extend across approximately 60% and 40% of the seat back 12, respectively. It is also contemplated that the seat back frame 34 may be split into more than two portions that may have equal or unequal widths. For instance, the seat back frame 34 may have a 40/20/40 split configuration. It is also contemplated that the seat back frame 34 may not be split.

In at least one configuration, the seat back frame 34 may be configured to be mounted on a support structure 50, such as a floor pan of a vehicle. For instance, one or more rear mounting bracket assemblies 52 may couple the seat back frame 34 to the to the support structure 50. In the configuration shown, two rear mounting bracket assemblies 52 are associated with each portion 40, 40' of the seat back frame 34; however, it is contemplated that a different number of rear mounting bracket assemblies may be provided. The rear mounting bracket assemblies 52 may be fixedly disposed on the support structure 50 and may be spaced apart from the seat bottom 14.

Referring to FIGS. 1 and 2, the seat bottom 14 may be configured to support the posterior of a seat occupant. The seat bottom 14 may be configured to be mounted on the support structure 50. In at least one configuration, the seat bottom 14 may include a trim cover 60, a cushion 62, a seat bottom frame 64, a first front mounting bracket assembly 66, and a second front mounting bracket assembly 68.

Referring to FIG. 1, the trim cover 60 may form an exterior surface of at least a portion of the seat bottom 14. The trim cover 60 may be disposed on the cushion 62 and may at least partially cover or conceal the cushion 62. For example, the trim cover 60 may extend across a top side of the cushion 62 that may be configured to face toward a seat occupant. In addition, the trim cover 60 may extend across a front side and opposing lateral sides of the cushion 62. The trim cover 60 may be made of any suitable material and may be mounted on the seat bottom 14 in any suitable manner as previously described with respect to the trim cover 30 of the seat back 12.

The cushion 62 may be configured to help support a seat occupant. The cushion 62 may be disposed on the seat bottom frame 64 and may be made of any suitable material. For example, the cushion 62 may be made of a molded polymeric material, such as open cell foam or closed cell foam.

Referring to FIG. 2, the seat bottom frame 64, and hence the seat bottom 14, is depicted as being split into two portions that may be independently rotatable or pivotable with respect to each other. For clarity in reference, the portions are numbered from right to left with reference numbers 70 and 70'. Portion 40 of the seat back frame 34 may be coupled to portion 70 of the seat bottom frame 64. Portion 40' of the seat back frame 34 may be coupled to portion 70' of the seat bottom frame 64. The portions 70, 70' may or may not have substantially the same sizes and may be provided with a split configuration that may match the split configuration of the seat back frame 34 as previously discussed. It is also contemplated that the seat bottom frame 64 may not be split.

The portions 70, 70' of the seat bottom frame 64 may include a plurality of components. For brevity, the text below will focus on the configuration of portion 70; however, one or more other portions of the seat bottom frame 64 may be provided with a substantially similar configuration or the same configuration as portion 70. For instance, in at least one configuration, portion 70, portion 70', or both may include a perimeter tube assembly 80, a cross tube assembly 82, one or more suspension wires 84, and a pair of connecting brackets 86.

Figure 3:
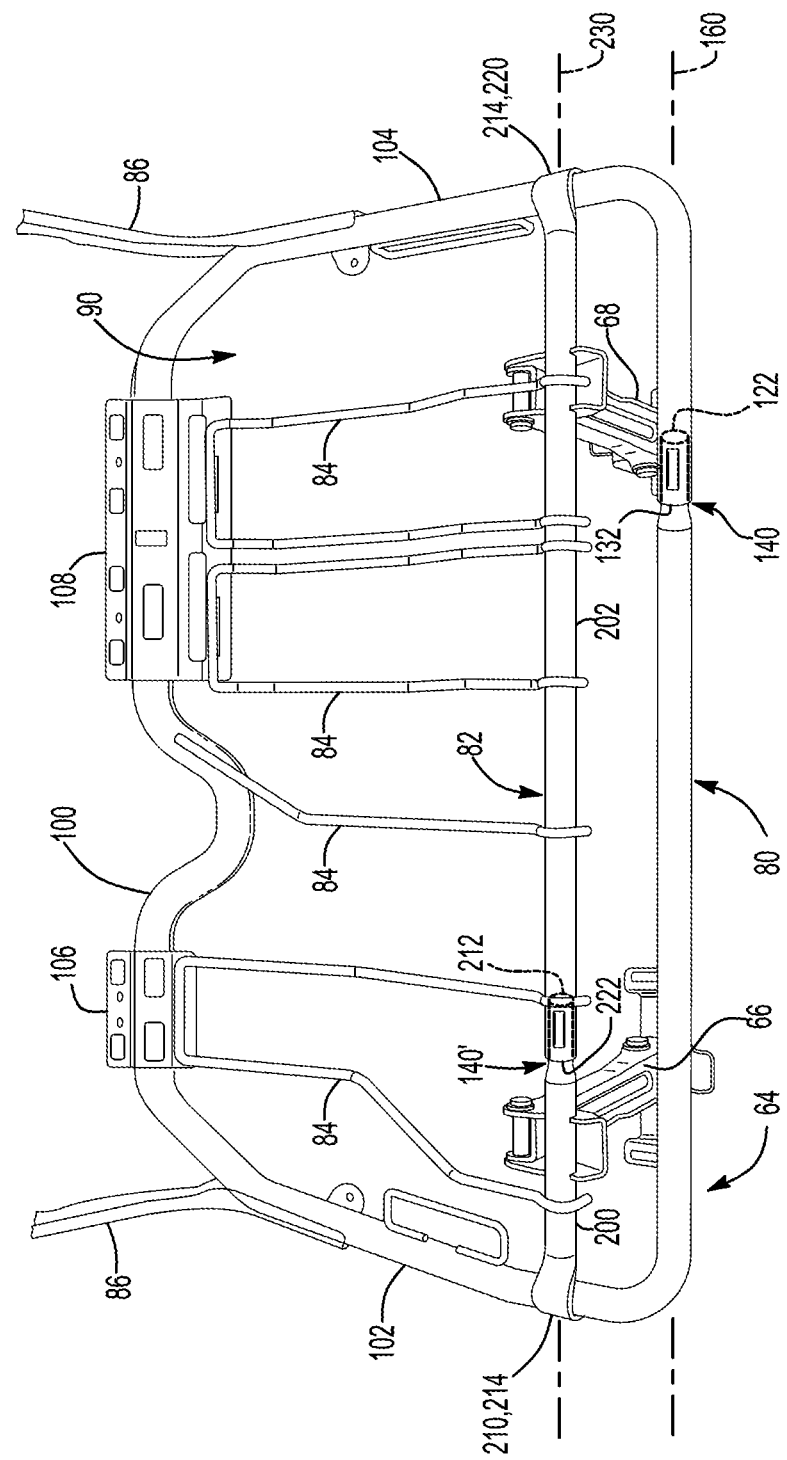
FIG. 3 is a perspective view of the seat bottom frame.
Figure 4:
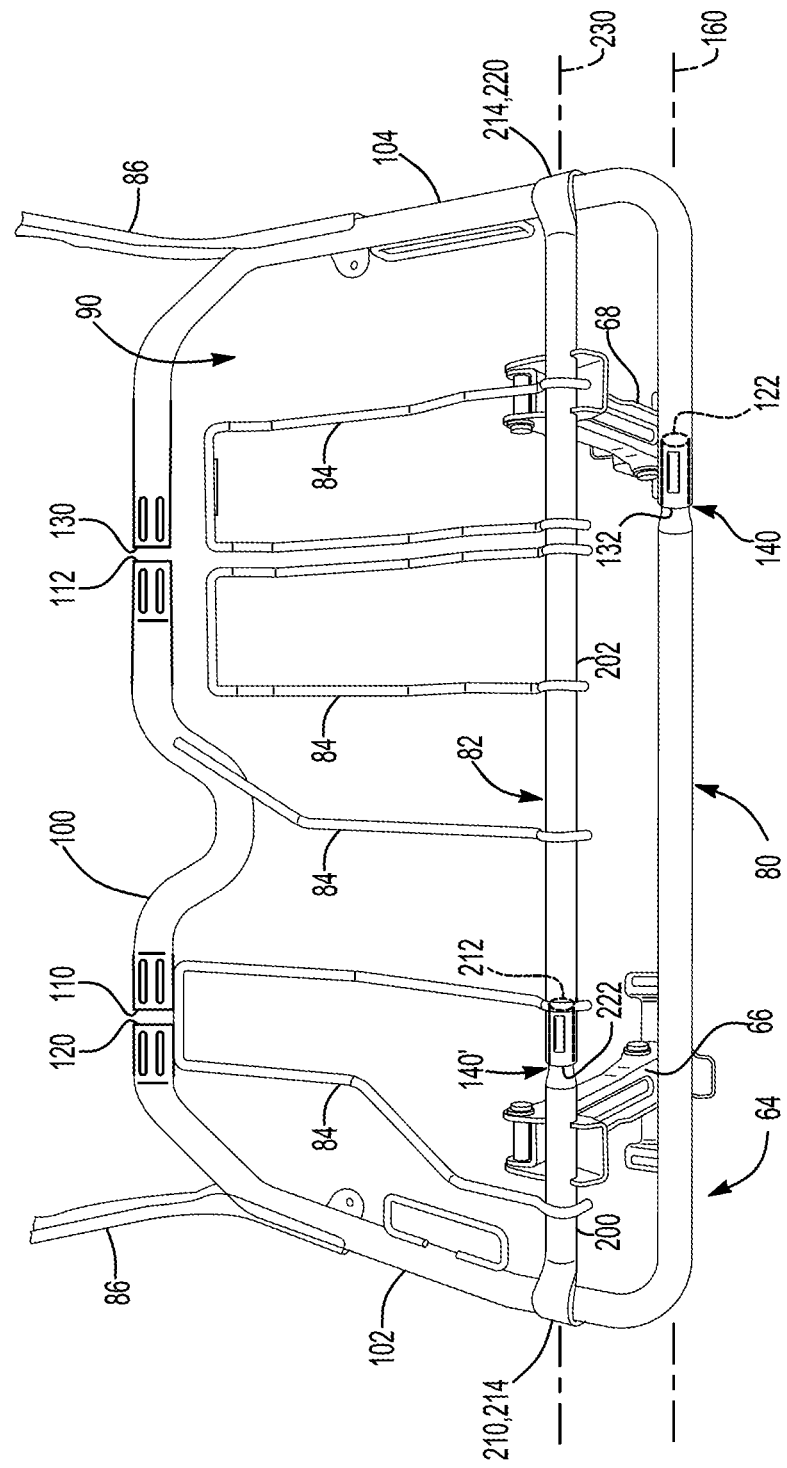
FIG. 4 is a perspective view of the seat bottom frame without first and second brackets that are shown in FIG. 3.

Referring primarily to FIGS. 3 and 4, the perimeter tube assembly 80 may define a perimeter of the seat bottom frame 64. In addition, the perimeter tube assembly 80 may extend around an opening 90 and may at least partially define the opening 90. The perimeter tube assembly 80 may include a plurality of tubes. The tubes may be hollow and may have any suitable cross-section, such as a substantially circular cross-section. In at least one configuration, the perimeter tube assembly 80 may include a first tube 100, a second tube 102, and a third tube 104. It is contemplated that a different number of tubes may be provided. In addition, the perimeter tube assembly 80 may include a first bracket 106 and a second bracket 108.

Referring primarily to FIG. 4, the first tube 100 may be disposed at a rear side of the seat bottom frame 64, which may be generally disposed underneath the seat back 12 and located at the top of FIG. 4. The first tube 100 may have a first end 110 and a second end 112 disposed opposite the first end 110.

The second tube 102 may define a first lateral side of the seat bottom frame 64 and a portion of the front side of the seat bottom frame 64. The front side may be disposed opposite the rear side and may be disposed at the front of the seat bottom 14 or at the bottom of FIG. 4 from the perspective shown. The first lateral side may extend from the front side to the back side and may be located at the left side of FIG. 4 from the perspective shown. The second tube 102 may have a first end 120 and a second end 122 that may be disposed opposite the first end 120. The first end 120 may be disposed proximate the first end 110 of the first tube 100.

The third tube 104 may define a second lateral side of the seat bottom frame 64 that may be extend from the front side to the back side and may be disposed opposite the first lateral side, or at the right of FIG. 4 from the perspective shown. In addition, the third tube 104 may define a remainder of the front side of the seat bottom frame 64 that is not defined by the second tube 102. The third tube 104 may have a first end 130 and a second end 132 that may be disposed opposite the first end 130. The first end 130 may be disposed proximate the second end 112 of the first tube 100. The area proximate the second end 132 may cooperate with the area proximate the second end 122 of the second tube 102 to define a telescoping tube joint 140.

Figure 5:
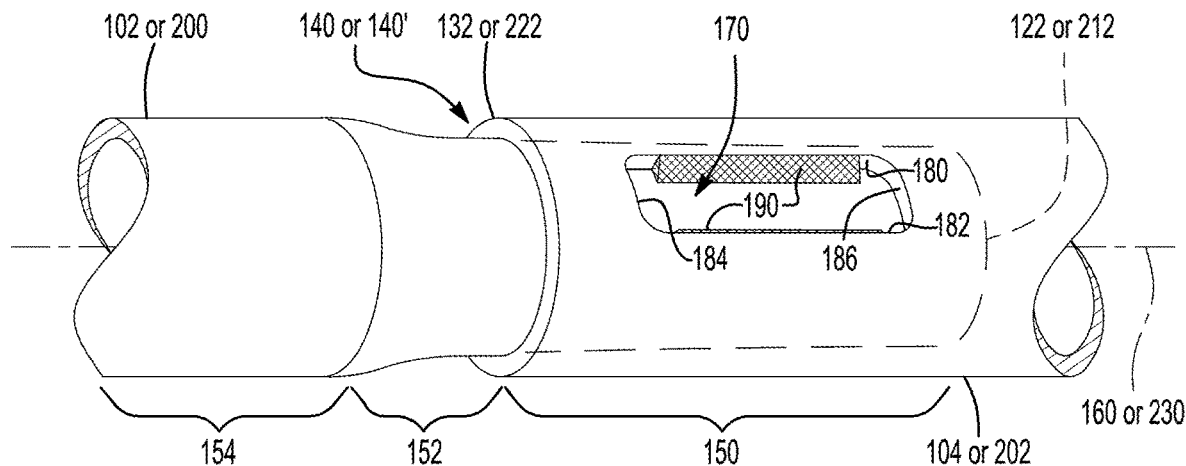
FIG. 5 illustrates an example of a telescoping tube joint.

Referring to FIGS. 3 and 5 the telescoping tube joint 140 may be disposed at the front side of the seat bottom frame 64. The telescoping tube joint 140 may allow the positioning of the second tube 102 relative to the third tube 104 to be axially adjusted prior to welding as will be discussed in more detail below. The telescoping tube joint 140 may be an extendible and retractable male/female interface. For instance, the second end 122 of the second tube 102 may be provided with a male configuration and the second end 132 of the third tube 104 may be provided with a female configuration that may receive the second end 122 of the second tube 102. It is also contemplated that this configuration may be reversed such that the second end 122 may have a female configuration and the second end 132 may have a male configuration. In the text below, the telescoping tube joint 140 will primarily be described with a configuration in which the second tube 102 has a male configuration and the third tube 104 has a female configuration as is best shown in FIG. 5.

Referring to FIG. 5, a magnified view of an example of a telescoping tube joint 140 is shown. In this example, the outside diameter of the second tube 102 is reduced at the second end 122 such that the second end 122 may fit inside the third tube 104. For example, the second tube 102 may have a reduced diameter portion 150 that may extend from the second end 122 to a tapered portion 152. The diameter of the tapered portion 152 may increase in a direction that extends in an axial direction away from the second end 122 until a nominal diameter portion 154 is reached. The nominal diameter portion 154 may have the same diameter or substantially the same configuration as the remainder of the third tube 104 or a portion thereof. The second tube 102 may be slidable inside the third tube 104 in an axial direction or along a tube axis 160 about which the second tube 102 and the third tube 104 may extend. The second tube 102 may slide further into the third tube 104 until the second end 132 of the third tube 104 contacts the tapered portion 152.

The third tube 104 may define at least one window 170. The window 170 may be a through hole that may extend through the third tube 104 from an outer surface of the third tube 104 to an inner surface of the third tube 104 that may be disposed opposite the outer surface. In the configuration shown, two windows 170 are provided that may have the same configuration, may be spaced apart from each other, and may be disposed directly opposite each other. A window 170 may be spaced apart from the ends of the third tube 104. For example, the window 170 may be spaced apart from the second end 132 of the third tube 104. In at least one configuration, the window 170 may generally have a quadrilateral configuration, such as a rectangular configuration with rounded corners, and may be bounded by a first side 180, a second side 182, a third side 184, and a fourth side 186.

The first side 180 may be spaced apart from the second side 182. In at least one configuration, the first side 180 and the second side 182 may extend parallel or substantially parallel to the tube axis 160. In at least one configuration, the first side 180 and the second side 182 may be longer than the third side 184 and the fourth side 186.

The third side 184 may extend between the first side 180 and the second side 182. For instance, the third side 184 may be disposed substantially perpendicular to the first side 180 and the second side 182 and may be disposed closer to the second end 132 of the third tube 104 than the fourth side 186.

The fourth side 186 may be spaced apart from the third side 184 and may extend between the first side 180 to the second side 182. For instance, the fourth side 186 may be disposed opposite the third side 184 and may be disposed substantially parallel to the third side 184 in one or more embodiments.

One or more welds 190 may be provided in the window 170 to hold the telescoping tube joint 140 in a desired position. For example, one or more welds 190 may fixedly attach the second tube 102 to the third tube 104. In the configuration shown, two welds 190 are provided. A first weld 190 may extend along the first side 180 of the window 170. A second weld 190 may extend along the second side 182 of the window 170 and may be spaced apart from the first weld 190. In at least one configuration, the second tube 102 and the third tube 104 may be fixedly attached to each other only with the first weld 190 and the second weld 190. The telescoping tube joint 140 may be provided without mechanical fasteners that may extend through and may weaken the tubes. In addition, the telescoping tube joint 140 may be provided without welds that extend around the tube axis 160, without a weld provided at an end of a tube, and without a weld that may extend around the circumference of a tube, which may help simplify assembly as linear welds may be provided rather than welds that extend around a curved surface. In addition, the telescoping tube joint 140 may be fixedly joined without an adhesive.

The reduced diameter portion 150 of the second tube 102 may be provided with a sufficient length such that second end 122 of the second tube 102 extends past the fourth side 186 and may not be visible through the window 170. As such, the reduced diameter portion 150 may have a greater axial length than the distance from the second end 132 of the third tube 104 to the fourth side 186. Such a configuration may help reduce stress concentrations near the window 170 and may help inhibit buckling or bending of the third tube 104. Moreover, such a configuration may allow longer welds 190 to be provided as compared to a configuration in which the reduced diameter portion 150 does not extend to the fourth side 186 of the window 170.

Referring to FIG. 3, the first bracket 106 may be disposed along the rear side of the seat bottom frame 64. The first bracket 106 may attach or couple the first tube 100 to the second tube 102. For instance, the first tube 100 may be welded to the first bracket 106 near the first end 110 of the first tube 100 and the second tube 102 may be welded to the first bracket 106 near the first end 120 of the second tube 102 (the ends being best shown in FIG. 4). The first end 110 of the first tube 100 and the first end 120 of the second tube 102 may face toward each other and may be spaced apart from each other. It is also contemplated that the first end 110 and the first end 120 may abut each other but the first tube 100 may not be welded to the second tube 102 in one or more configurations.

The second bracket 108 may be disposed along the rear side of the seat bottom frame 64 and may be spaced apart from the first bracket 106. The second bracket 108 may attach or couple the first tube 100 to the third tube 104. For instance, the first tube 100 may be welded to the second bracket 108 near the second end 112 of the first tube 100 and the third tube 104 may be welded to the second bracket 108 near the first end 130 of the third tube 104 (the ends being best shown in FIG. 4). The second end 112 of the first tube 100 and the first end 130 of the third tube 104 may face toward each other and may be spaced apart from each other. It is also contemplated that the second end 112 and the first end 130 may abut each other but the first tube 100 may not be welded to the third tube 104 in one or more configurations.

Referring to FIGS. 3 and 4, the cross tube assembly 82 may extend across the opening 90. The cross tube assembly 82 may include a plurality of tubes. The tubes may be hollow and may have any suitable cross section, such as a substantially circular cross-section. In at least one configuration, the cross tube assembly 82 may include a first cross tube segment 200 and a second cross tube segment 202. It is contemplated that the designations for the first cross tube segment 200 and the second cross tube segment 202 may be reversed from the illustrated configuration.

Figure 6:
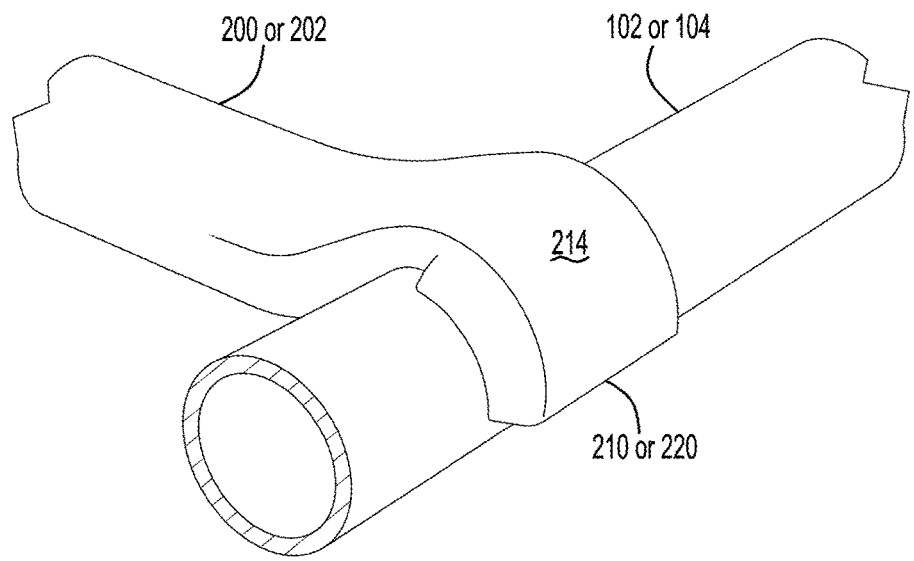
FIG. 6 is an enlarged view of an end of cross tube assembly that may be provided with the seat bottom frame.

Referring primarily to FIG. 4, the first cross tube segment 200 may have a first end 210 and a second end 212 that may be disposed opposite the first end 210. The first end 210 may be fixedly attached to the perimeter tube assembly 80. For example, the first end 210 may be fixed to the second tube 102. As is best shown with reference to FIGS. 4 and 6, a saddle 214 may be provided at the first end 210 that may rest upon and may receive the second tube 102 of the perimeter tube assembly 80.

The second cross tube segment 202 may also have a first end 220 and a second end 222. The first end 220 may be fixedly attached to the perimeter tube assembly 80. For example, the first end 220 may be fixed to the third tube 104. A saddle 214 may be provided at the first end 220 that may rest upon and may receive the third tube 104 of the perimeter tube assembly 80.

The second end 212 of the first cross tube segment 200 and the second end 222 of the second cross tube segment 202 may cooperate to form another telescoping tube joint, which may be referred to as a cross tube telescoping tube joint 140' for clarity in reference. The telescoping tube joint 140 and the cross tube telescoping tube joint 140' may have substantially similar configurations. In addition, the telescoping tube joints 140, 140' may be aligned along substantially parallel axes to facilitate adjustments to the width of the seat bottom frame 64 prior to welding as will be discussed in more detail below.

The telescoping tube joint 140' may allow the positioning of the first cross tube segment 200 relative to the second cross tube segment 202 to be axially adjusted prior to welding as will be discussed in more detail below. The telescoping tube joint 140' may be an extendible and retractable male/female interface. For instance, the second end 212 of the first cross tube segment 200 may be provided with a male configuration and the second end 222 of the second cross tube segment 202 may be provided with a female configuration that may receive the second end 212 of the first cross tube segment 200. It is also contemplated that this configuration may be reversed such that the second end 212 may have a female configuration and the second end 222 may have a male configuration. In the text below, the telescoping tube joint 140 will primarily be described with a configuration in which the first cross tube segment 200 has a male configuration and the second cross tube segment 202 has a female configuration.

In such a configuration and as is best shown with reference to FIG. 5, the outside diameter of the first cross tube segment 200 is reduced near the second end 212 such that the second end 212 may fit inside the second cross tube segment 202. For example, the first cross tube segment 200 may have a reduced diameter portion 150 that may extend from the second end 212 to a tapered portion 152. The diameter of the tapered portion 152 may progressively increase in a direction that extends away from the second end 212 until a nominal diameter portion 154 is reached. The nominal diameter portion 154 may have the same diameter or substantially the same configuration as the first cross tube segment 200 or a portion thereof. The first cross tube segment 200 may be slidable inside the second cross tube segment 202 in an axial direction or along a cross tube axis 230 about which the first cross tube segment 200 and the second cross tube segment 202 may extend. The first cross tube segment 200 may slide further into the second cross tube segment 202 until the second end 222 of the second cross tube segment 202 contacts the tapered portion 152. The cross tube axis 230 may be disposed parallel or substantially parallel to the tube axis 160.

The second cross tube segment 202 may define at least one window 170. Two windows 170 may be provided that may have the same configuration, may be spaced apart from each other, and may be disposed directly opposite each other. One or more welds 190 may be provided in the window 170 to hold the cross tube telescoping tube joint 140' in place. The welds may be provided along one or more sides of the window 170, such as the first side 180, the second side 182, or both as previously described. The reduced diameter portion 150 may have a greater axial length than the distance from the second end 222 of the second cross tube segment 202 to the fourth side 186.

Referring to FIG. 3, the cross tube telescoping tube joint 140' may be axially positioned closer to the first bracket 106 than the telescoping tube joint 140 of the perimeter tube assembly 80. The telescoping tube joint 140 of the perimeter tube assembly 80 may be axially positioned closer to the second bracket 108 than the cross tube telescoping tube joint 140'. In addition, the cross tube telescoping tube joint 140' may be axially positioned closer to the first lateral side (at the left of FIG. 3 from the perspective shown) than the telescoping tube joint 140 of the perimeter tube assembly 80 is positioned with respect to the first lateral side. Conversely, the telescoping tube joint 140 of the perimeter tube assembly 80 may be axially positioned closer to the second lateral side (at the right of FIG. 3 from the perspective shown) than the cross tube telescoping tube joint 140' is positioned with respect to the second lateral side.

Referring to FIG. 3, one or more suspension wires 84 may extend partially across the opening 90. The suspension wires 84 may help support the cushion 62 of the seat bottom 14. A suspension wire 84 may extend from the cross tube assembly 82 to the first bracket 106, the second bracket 108, to a tube of the perimeter tube assembly 80, or combinations thereof. In the configuration shown, four suspension wires 84 are shown; however, it is contemplated that a greater or lesser number of suspension wires 84 may be provided. The suspension wire 84 disposed furthest to the left, which may be referred to as a first suspension wire, may extend from the first bracket 106 to the cross tube assembly 82. For instance, the first suspension wire may have a generally U-shaped configuration in which a first end of the first suspension wire may be fixedly coupled to the first cross tube segment 200, an opposing second end of the first suspension wire may be fixedly coupled to the second cross tube segment 202 between the window 170 and the first end 220, and a portion of the first suspension wire located between the first and second ends may be fixedly coupled to the first bracket 106. The suspension wire 84 to the right of the first suspension wire may be fixedly coupled to first tube 100 and to a portion of the cross tube assembly 82, such as the second cross tube segment 202. The suspension wire or suspension wires further to the right in FIG. 3 may extend from the second bracket 108 to the cross tube assembly 82. For instance, the rightmost suspension wires may have a generally U-shaped configuration having ends that wire are fixedly coupled to the second cross tube segment 202 and a middle portion between the ends that is fixedly coupled to the second bracket 108.

Referring to FIG. 2, a pair of connecting brackets 86 may operatively connect the seat back frame 34 to the seat bottom frame 64. A connecting bracket 86 may be fixedly attached a portion of the seat bottom frame 64, such as the perimeter tube assembly 80 and may be pivotally attached to the seat back frame 34 along a pivot axis 240. The connecting brackets 86 may synchronize movement of the seat back 12 and the seat bottom 14. For instance, pivoting the seat back 12 forward about the axis 20 from the generally upright seating position shown in FIG. 2 may move the connecting brackets 86 forward, which may rotate the connecting brackets 86 about the pivot axis 240 and push the seat bottom 14 forward such that the seat bottom 14 moves forward and downward due to forward rotation of the first front mounting bracket assembly 66 and the second front mounting bracket assembly 68 about an upper front axis 250 and a lower front axis 252.

The first front mounting bracket assembly 66 and the second front mounting bracket assembly 68 may couple or facilitate mounting of the seat bottom frame 64 to the support structure 50. In addition, the first front mounting bracket assembly 66 and the second front mounting bracket assembly 68 may facilitate rotation of the seat bottom 14. The first front mounting bracket assembly 66 and the second front mounting bracket assembly 68 may have the same configuration or different configurations depending on the configuration of the support structure 50.

The first front mounting bracket assembly 66 may extend from the support structure 50 to the cross tube assembly 82 and may facilitate rotation about the upper front axis 250 and the lower front axis 252. For instance, the first front mounting bracket assembly 66 may include a lower bracket, an upper bracket, and a linkage. The lower bracket may be fixedly mounted to the support structure 50. The upper bracket may be fixedly mounted to a portion of the cross tube assembly 82, such as the first cross tube segment 200. The linkage may be pivotally coupled to the lower bracket at a first end and may be pivotally coupled to the upper bracket at a second end.

The second front mounting bracket assembly 68 may have a similar configuration as the first front mounting bracket assembly 66 and may facilitate rotation about the upper front axis 250 and the lower front axis 252. The second front mounting bracket assembly 68 may extend from the support structure 50 to the second cross tube segment 202 in one or more configurations.

An example of a method of assembling the seat assembly 10 and the seat bottom frame 64 is as follows.

First, components of the perimeter tube assembly 80 may be positioned with respect to each other. Such positioning may be facilitated by a fixture or jig that may hold the components in desired locations. For instance, the first tube 100, the second tube 102, and the third tube 104 may be positioned in end-to-end relationships as previously described and such that the second ends 122, 132 of the second tube 102 and the third tube 104 are arranged to provide the telescoping tube joint 140.

Next, the components of the cross tube assembly 82 may be positioned with respect to each other and to the perimeter tube assembly 80. For instance, the first cross tube segment 200 and the second cross tube segment 202 may be arranged to provide the cross tube telescoping tube joint 140' and may be positioned on the perimeter tube assembly 80 such that the saddles 214 of the first cross tube segment 200 and the second cross tube segment 202 rest upon the second tube 102 and the third tube 104, respectively.

The fixture may help position of the cross tube assembly 82 and may help adjust and set the axial length of the telescoping tube joint 140 and the cross tube telescoping tube joint 140'. For instance, the axial length of the telescoping tube joint 140 or distance the second tube 102 is inserted into the third tube 104 may be lengthened or shortened to allow the components of the perimeter tube assembly 80 to located in desired distances and orientations with respect to each other. Similarly, the axial length of the cross tube telescoping tube joint 140' or distance that the first cross tube segment 200 is inserted into the second cross tube segment 202 may be lengthened or shortened to allow the saddles 214 to receive and follow the contour of the second tube 102 and the third tube 104, respectively. Moreover, the first and second ends 110, 112 of the first tube 100 may or may not contact the first ends 120, 130, of the second tube 102 and the third tube 104, respectively when positioned in the fixture. As such, the telescoping tube joint 140, the cross tube telescoping tube joint 140', and providing the first tube 100 as a separate component from the second tube 102 and the third tube 104 may allow the seat bottom frame 64 to be assembled in a desired configuration while accommodating design tolerances of multiple components.

Next, components of the seat bottom frame 64 may be welded together. The components may be welded together in any suitable order. For instance, one or more components of the perimeter tube assembly 80 may be welded together before welding components of the cross tube assembly 82. In addition or alternatively, the telescoping tube joints 140, 140' may be welded after welding other components of the seat bottom frame 64 to each other. In at least one configuration, the first tube 100 and the second tube 102 may be welded to the first bracket 106, the first tube 100 and the third tube 104 may be welded to the second bracket 108, the first end 210 of the first cross tube segment 200 may be welded to the second tube 102, and the first end 220 of the second cross tube segment 202 may be welded to the third tube 104. Then, the telescoping tube joint 140 may be welded to fixedly attach the second tube 102 and the third tube 104 and the cross tube telescoping tube joint 140' may be welded to fixedly attach the first cross tube segment 200 and the second cross tube segment 202. The telescoping tube joint 140 may be welded before the cross tube telescoping tube joint 140' is welded or vice versa.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
a seat bottom frame that includes:
a perimeter tube assembly that defines a perimeter of the seat bottom frame and that extends around and defines an opening;
a cross tube assembly that extends across the opening and that has a first cross tube segment and a second cross tube segment that cooperate to provide a cross tube telescoping tube joint in which an end of the first cross tube segment is received inside the second cross tube segment, wherein the second cross tube segment defines a window that extends through the second cross tube segment; and
a first weld that is positioned in the window that fixedly attaches the first cross tube segment to the second cross tube segment.

2. The seat assembly of claim 1 wherein a first front mounting bracket assembly and a second front mounting bracket assembly that facilitate mounting of the seat bottom frame to a support structure are attached to the cross tube assembly.

3. The seat assembly of claim 2 wherein the first front mounting bracket assembly is attached to the first cross tube segment and the second front mounting bracket assembly is attached to the second cross tube segment.

4. The seat assembly of claim 1 wherein the first cross tube segment is fixedly attached to the perimeter tube assembly at an end of the first cross tube segment that is disposed opposite the cross tube telescoping tube joint and the second cross tube segment is fixedly attached to the perimeter tube assembly at an end of the second cross tube segment that is disposed opposite the telescoping tube joint.

5. The seat assembly of claim 1 wherein the cross tube assembly extends along a cross tube axis, and the window has a first side and a second side that extend substantially parallel to the cross tube axis, a third side that extends from the first side to the second side, and a fourth side that is disposed opposite the third side and extends from the first side to the second side, wherein the first and second sides are longer than the third and fourth sides and the first weld is provided along the first side.

6. The seat assembly of claim 5 wherein the first cross tube segment is received inside the second cross tube segment and extends into the second cross tube segment such that an end of the first cross tube segment that is received inside the second cross tube segment extends past the fourth side and is not visible through the window.

7. The seat assembly of claim 5 further comprising a second weld that is positioned in the window along the second side, wherein the second weld fixedly attaches the first cross tube segment to the second cross tube segment.

8. The seat assembly of claim 7 wherein the first cross tube segment is fixedly attached to the second cross tube segment only with the first weld and the second weld.

9. The seat assembly of claim 1 wherein the perimeter tube assembly includes:
a first tube that has a first end and a second end;
a second tube that has a first end that is disposed proximate the first end of the first tube and a second end; and
a third tube that has a first end that is disposed proximate the second end of the first tube and a second end that cooperates with the second end of the second tube to provide a telescoping tube joint.

10. The seat assembly of claim 9 wherein the first tube is disposed at a rear side of the seat bottom frame and the telescoping tube joint is disposed at a front side of the seat bottom frame that is disposed opposite the rear side.

11. The seat assembly of claim 10 wherein the first tube is attached to the second tube via a first bracket, the first tube is attached to the third tube via a second bracket, the first bracket and the second bracket are disposed along the rear side of the seat bottom frame, a first suspension wire for supporting a seat bottom cushion extends from the first bracket to the cross tube assembly, and a second suspension wire for supporting a seat bottom cushion extends from the second bracket to the cross tube assembly.

12. The seat assembly of claim 11 wherein the cross tube telescoping tube joint is axially positioned closer to the first bracket than the telescoping tube joint and the telescoping tube joint is axially positioned closer to the second bracket than the cross tube telescoping tube joint.

13. The seat assembly of claim 11 wherein the first cross tube segment has a first saddle that is disposed at an end of the first cross tube segment that is located opposite the cross tube telescoping tube joint and that rests on the second tube, and the second cross tube segment has a second saddle that is disposed at an end of the second cross tube segment that is located opposite the cross tube telescoping tube joint and that rests on the third tube.

14. The seat assembly of claim 11 wherein the first cross tube segment and the second end of the second tube have a male configuration and the second cross tube segment and the second end of the third tube have a female configuration that receive the first cross tube segment and the second end of the second tube, respectively.

15. The seat assembly of claim 10 wherein the second tube defines a first lateral side of the seat bottom frame and a portion of the front side of the seat bottom frame, and the third tube defines a second lateral side of the seat bottom frame that is disposed opposite the first lateral side and a remainder of the front side of the seat bottom frame.

16. The seat assembly of claim 15 wherein the cross tube telescoping tube joint is positioned closer to the first lateral side than the telescoping tube joint and the telescoping tube joint is positioned closer to the second lateral side than the cross tube telescoping tube joint.

17. A method of making a seat assembly comprising:
positioning a first tube, a second tube, and a third tube such that a first end of the second tube is disposed proximate a first end of the first tube, a first end of the third tube is disposed proximate a second end of the first tube, and a second end of the second tube and a second end of the third tube are arranged to provide a telescoping tube joint;
arranging a first cross tube segment and a second cross tube segment to provide a cross tube telescoping tube joint;
joining the first tube and the second tube to a first bracket;
joining the first tube and the third tube to a second bracket;
welding a first end of the first cross tube segment that is disposed opposite the cross tube telescoping tube joint to the second tube and welding a first end of the second cross tube segment that is disposed opposite the cross tube telescoping tube joint to the third tube;
welding the telescoping tube joint to fixedly attach the second tube to the third tube; and
welding the cross tube telescoping tube joint to fixedly attach the first cross tube segment and the second cross tube segment.

18. The method of claim 17 further comprising adjusting an axial length of the telescoping tube joint before welding the telescoping tube joint and adjusting an axial length of the cross tube telescoping tube joint before welding the cross tube telescoping tube joint.

19. The method of claim 17 further comprising welding the telescoping tube joint before welding the cross tube telescoping tube joint.

20. The method of claim 17 wherein welding the telescoping tube joint includes providing a first weld and a second weld in a window in the third tube that is spaced apart from an end of the third tube to fixedly attach the second tube to the third tube, wherein the second tube is fixedly attached to the third tube only with the first weld and the second weld; and
welding the cross tube telescoping tube joint includes providing a pair of welds in a window in the second cross tube segment, wherein the pair of welds is spaced apart from an end of the second cross tube segment and wherein the second cross tube segment is fixedly attached to the first cross tube segment only with the pair of welds.

* * * * *